US012584590B2

(12) United States Patent
Matsumoto et al.

(10) Patent No.: US 12,584,590 B2
(45) Date of Patent: Mar. 24, 2026

(54) PRESSURE VESSEL AND METHOD FOR PRODUCING PRESSURE VESSEL

(71) Applicant: Mitsubishi Gas Chemical Company, Inc., Tokyo (JP)

(72) Inventors: Nobuhiko Matsumoto, Hiratsuka (JP); Kousuke Ikeuchi, Hiratsuka (JP); Jun Mitadera, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 383 days.

(21) Appl. No.: 18/266,100

(22) PCT Filed: Oct. 6, 2021

(86) PCT No.: PCT/JP2021/036919
§ 371 (c)(1),
(2) Date: Jun. 8, 2023

(87) PCT Pub. No.: WO2022/123883
PCT Pub. Date: Jun. 16, 2022

(65) Prior Publication Data

US 2024/0027024 A1 Jan. 25, 2024

(30) Foreign Application Priority Data

Dec. 11, 2020 (JP) ................................ 2020-205936

(51) Int. Cl.
*B29K 105/08* (2006.01)
*B29L 31/00* (2006.01)
(Continued)

(52) U.S. Cl.
CPC ................ *F17C 1/06* (2013.01); *C08J 5/243* (2021.05); *C08J 5/249* (2021.05); *B29C 70/32* (2013.01);
(Continued)

(58) Field of Classification Search
CPC ........ F17C 2203/066; F17C 2203/0663–0673; F17C 2203/0604; F17C 2203/0619;
(Continued)

(56) References Cited

U.S. PATENT DOCUMENTS 3,598,275 A * 8/1971 Francois .................. B63B 3/13 428/113
5,025,943 A * 6/1991 Forsman .................. F17C 1/16 220/589

(Continued)

FOREIGN PATENT DOCUMENTS

CN 104507998 A 4/2015
JP 6-328577 A 11/1994

(Continued)

OTHER PUBLICATIONS

EPO; Application No. 21902987.3 Extended European Search Report dated Apr. 23, 2024 (10 pages).

(Continued)

*Primary Examiner* — Michael C. Romanowski
(74) *Attorney, Agent, or Firm* — Fitch, Even, Tabin & Flannery LLP

(57) ABSTRACT

Provided are a pressure vessel with excellent gas barrier properties, less likely to cause cracks, and excellent internal pressure fatigue properties, and a production method thereof. The pressure vessel includes a layer at least in the body part, and the layer includes a fiber-reinforced resin material that contains a resin component and a continuous reinforcing fiber. A ratio (inner region/outer region) of the continuous reinforcing fiber content (vol. %) in the inner region to a continuous reinforcing fiver content (vol. %) in the outer region is from 0.80 to 0.99, where the inner region is up to 0.1% from the inner side of the layer in the thickness direction, and the outer region is up to 0.1% from the outer side of the layer in the thickness direction, and the continu- (Continued)

ous reinforcing fiber content (vol. %) in the central region of the layer, which is between up to more than 0.1% from the inner side in the thickness direction and up to more than 0.1% from the outer side in the thickness direction, is from 40 to 60 vol. %.

20 Claims, 2 Drawing Sheets

(51) Int. Cl.
*C08J 5/24* (2006.01)
*F17C 1/06* (2006.01)
*B29C 70/32* (2006.01)

(52) U.S. Cl.
CPC ... *B29K 2105/08* (2013.01); *B29L 2031/7156* (2013.01); *C08J 2363/00* (2013.01); *F17C 2201/0109* (2013.01); *F17C 2203/012* (2013.01); *F17C 2203/0604* (2013.01); *F17C 2203/0619* (2013.01); *F17C 2203/0673* (2013.01); *F17C 2205/0323* (2013.01); *F17C 2209/2163* (2013.01); *F17C 2221/012* (2013.01); *F17C 2260/011* (2013.01)

(58) Field of Classification Search
CPC ...... F17C 2209/2154; F17C 2209/2163; F17C 2221/012; F17C 2260/011; B29L 2031/7156; F16J 12/00
USPC ......................... 220/560.04–567.3, 581–592; 428/34.1–36.92
See application file for complete search history.

(56) References Cited

U.S. PATENT DOCUMENTS 5,816,436 A * 10/1998 Grosjean ............... B29C 53/602 220/589
8,012,584 B2 * 9/2011 Sugiura ..................... F17C 1/06 428/36.1
2003/0183638 A1 10/2003 Minta et al.
2004/0206762 A1 * 10/2004 Iida ........................... F17C 1/06 220/581
2006/0096993 A1 5/2006 Takashima
2006/0099366 A1 * 5/2006 Takemoto ............... B29C 70/44 428/36.1
2009/0314785 A1 12/2009 Cronin et al.
2015/0059295 A1 3/2015 Honda et al.
2017/0146477 A1 * 5/2017 Di Sarno ............... A62C 13/76
2017/0211747 A1 * 7/2017 Cola ......................... F17C 1/16
2017/0343158 A1 * 11/2017 Kato ......................... F17C 1/06
2019/0170300 A1 * 6/2019 Cola ....................... F17C 13/00
2019/0232572 A1 * 8/2019 Ochiai .................... B29C 45/00
2020/0071515 A1 3/2020 Kouno
2020/0072416 A1 * 3/2020 Yoshida .................. B29C 49/20

FOREIGN PATENT DOCUMENTS

JP H06328577 A * 11/1994
JP 2016-102546 A 6/2016
JP 2018189178 A 11/2018
WO 2004/051138 A1 6/2004
WO 2016/084475 A1 6/2016

OTHER PUBLICATIONS

Cohen et al., Composites Part B, vol. 32, No. 5, 2001, pp. 413-429, “The effect of fiber volume fraction on filament wound composite pressure vessel strength.”
International Search Report and Written Opinion for PCT/JP2021/036919, mailed Dec. 14, 2021, and English Translation of the International Search Report submitted herewith (8 pages).
International Preliminary Report on Patentability for PCT/JP2021/036919, issued Jun. 13, 2023, and English Translation submitted herewith (8 pages).
Communication pursuant to Article 94(3) EPC issued in corresponding European Patent Application No. 21902987.3; 1 dated Sep. 30, 2025; 10 pages.
Office Action issued in corresponding Chinese Patent Application No. 202180080461.2; dated Jan. 13, 2026; 11 pages.

* cited by examiner

PRESSURE VESSEL AND METHOD FOR PRODUCING PRESSURE VESSEL

CROSS-REFERENCE TO RELATED APPLICATIONS

This application is a U.S. national phase application filed under 35 U.S.C. § 371 of International Application Number PCT/JP2021/036919, filed Oct. 6, 2021, designating the United States, which claims priority from Japanese Application Number 2020-205936, filed Dec. 11, 2020.

FIELD OF THE INVENTION

The present invention relates to a pressure vessel and a method for producing the pressure vessel.

BACKGROUND OF THE INVENTION

In recent years, use of environmentally-friendly natural gas vehicles (CNG vehicles) and fuel cell vehicles (FCV) has become more widespread. Fuel cell vehicles are powered by fuel cells in which hydrogen is used as fuel, and thus the establishment of hydrogen stations at which vehicles are filled with hydrogen that is compressed to a high pressure is essential.

Thus far, tanks made of steel have been used as high-pressure gas storage tanks that are used for tanks installed in hydrogen stations for fuel cell vehicles, or as vehicle-mounted fuel tanks for vehicles such as CNG vehicles and fuel cell vehicles. However, as weight reduction of vehicle bodies is demanded, the development of lighter weight high-pressure gas storage tanks, in which a resin material is used in a liner or in an outer layer of the tank, is advancing. Reducing the weight of a vehicle-mounted fuel tank results in merits such as an improvement in the fuel economy of the vehicle in which the fuel tank is mounted.

Use of a resin having gas barrier properties and a fiber-reinforced composite material (FRP in which reinforcing fibers are impregnated with the resin as a resin material constituting a high-pressure gas storage tank is known.

For example, Patent Document discloses a pressure vessel that includes a liner and an outer layer of the liner, with the outer layer being constituted of a composite material containing continuous fibers and a predetermined polyamide resin having gas barrier properties and infiltrated into the continuous fibers, and also describes a liner made of the composite material.

CITATION LIST

Patent Documents

Patent Document 1: WO 2016/084475

SUMMARY OF INVENTION

Note that, although the pressure vessel disclosed in Patent Document 1 is good, in recent years, because pressure vessels are used for various purposes, and a novel pressure vessel using a fiber-reinforced resin material has been required.

In particular, a pressure vessel that has excellent gas barrier properties and that is less likely to cause cracks in various conditions has been demanded.

The present invention is to solve such issues, and an object of the present invention is to provide a pressure vessel that has excellent gas barrier properties and that is less likely to cause cracks in various conditions, and a production method thereof.

As a result of the studies by the present inventors for the object described above, it was found that the issue described above can be solved by adjusting volume fraction of continuous reinforcing fibers in a pressure vessel including a layer made of a fiber-reinforced resin material.

Specifically, the issues described above are solved by the following means.

<1> A pressure vessel including a layer at least in a body part, the layer including a fiber-reinforced resin material containing a resin component and a continuous reinforcing fiber, in which a ratio (inner region/outer region) of a continuous reinforcing fiber content (vol. %) in an inner region of the layer to a continuous reinforcing fiber content (vol. %) in an outer region of the layer is from 0.80 to 0.99, the inner region being defined as up to 0.1% from the inner side of the layer in the thickness direction, the outer region being defined as up to 0.1% from the outer side of the layer in the thickness direction, and a continuous reinforcing fiber content (vol. %) in a central region of the layer is from 30 to 70 vol. %, the central region being defined as between up to more than 0.1% from the inner side in the thickness direction and up to more than 0.1% from the outer side in the thickness direction.

<2> The pressure vessel according to <1>, where a ratio (outer region/central region) of the continuous reinforcing fiber content (vol. %) in the outer region to the continuous reinforcing fiber content (vol. %) in the central region is from 1.01 to 1.11.

<3> The pressure vessel according to <1> or <2>, where a ratio (inner region/central region) of the continuous reinforcing fiber content (vol. %) in the inner region to the continuous reinforcing fiber content (vol. %) in the central region is from 0.95 to 1.05.

<4> The pressure vessel according to any one of <1> to <3>, where a thickness of the layer is from 1 to 10 cm.

<5> The pressure vessel according to any one of <1> to <4>, where the resin component includes a thermosetting resin.

<6> The pressure vessel according to any one of <1> to <5>, where the resin component includes an epoxy resin composition, the epoxy resin composition including an epoxy resin and an epoxy resin curing agent, the epoxy resin curing agent containing a reaction product of a component (x1) and a component (x2) below:

(x1) At least one selected from the group consisting of m-xylylenediamine and p-xylylenediamine; and (x2) At least one selected from the group consisting of an unsaturated carboxylic acid represented by Formula. (1) and a derivative thereof (1)

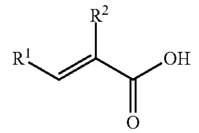

In Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

<7> The pressure vessel according to any one of <1> to <6>, where the continuous reinforcing fiber includes a carbon fiber.

<8> The pressure vessel according to any one of <1> to <7>, where a void rate of the layer is 1 vol. % or less.

<9> The pressure vessel according to any one of <1> to <8>, where the body part of the pressure vessel has a liner in the inner side of the layer.

<10> The pressure vessel according to any one of <1> to <8>, where the body part of the pressure vessel has no layer in the inner side of the layer.

<11> A method for producing the pressure vessel according to any one of <1> to <10>, the method including winding a fiber-reinforced resin material in a cylindrical form, the fiber-reinforced resin material comprising a resin component and a continuous reinforcing fiber, where a tension of the fiber-reinforced resin material when winding in the cylindrical form is from 0.01 gf to 3 gf per one strand of the continuous reinforcing fiber.

According to the present invention, a pressure vessel that has excellent gas barrier properties and that is less likely to cause cracks in various conditions and a production method thereof can be provided.

DESCRIPTION OF EMBODIMENTS

Figure 1:
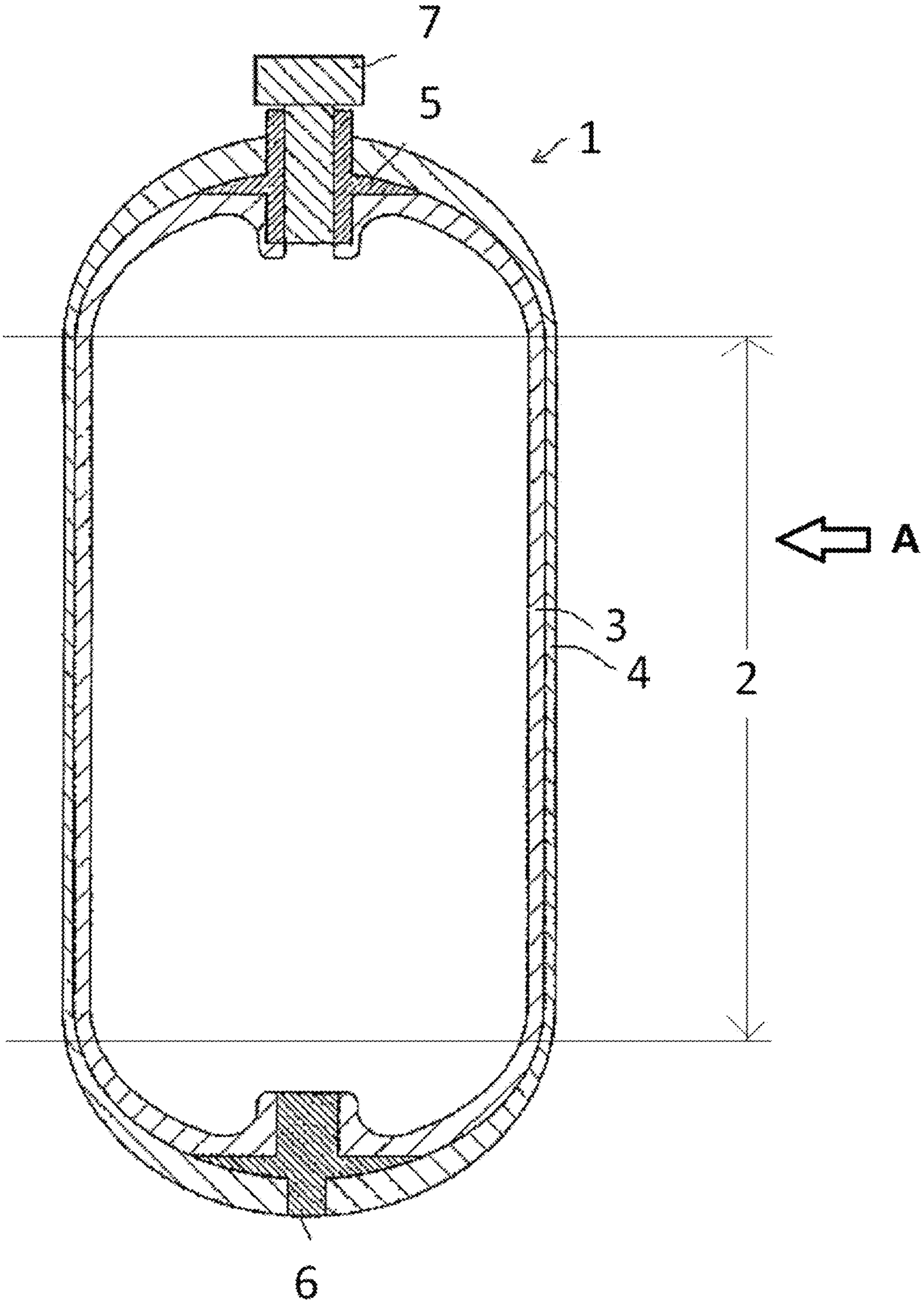
FIG. 1 is a cross-sectional schematic view illustrating an embodiment of a pressure vessel out of the present embodiments.

Hereinafter, some embodiments for carrying out the present invention (referred to simply as "the present embodiments" below) will be described in detail. Note that the following present embodiments are examples for describing the present invention, and the present invention is not limited to the present embodiments.

In the present description, "from to . . . " or "of . . . to . . . " is used to mean that the numerical values described before and after "to" are included as the lower limit and the upper limit, respectively.

In the present description, various physical property values and characteristic values are at 23° C. unless otherwise noted.

The pressure vessel according to the present embodiments is characterized by including a layer (hereinafter, also referred to as "gas barrier layer") at least in a body part, the layer including a fiber-reinforced resin material containing a resin component and a continuous reinforcing fiber. A ratio (inner region/outer region) of the continuous reinforcing fiber content (vol. %) in an inner region of the layer to the continuous reinforcing fiber content (vol. %) in an outer region of the layer is from 0.80 to 0.99, the inner region being defined as up to 0.1% from the inner side of the layer in a thickness direction, the outer region being defined as up to 0.1% from the outer side of the layer in a thickness direction, and the continuous reinforcing fiber content (vol. %) in a central region of the layer is from 30 to 70 vol. %, the central region being defined as between up to more than 0.1% from the inner side in the thickness direction and up to more than 0.1% from the outer side in the thickness direction.

By employing such a structure, a pressure vessel that has excellent gas barrier properties and is less likely to cause cracks in various conditions can be obtained.

While this is an assumption, the mechanism is assumed to be as follows. For the content of the continuous reinforcing fibers in the thickness direction of the gas barrier layer, by allowing a proportion of the continuous reinforcing fibers in the very thin inner region, which is up to 0.1% from the inner side in the thickness direction, to be relatively low, expansion due to charging of inner gas is absorbed, and occurrence of cracks can be suppressed. Furthermore, for the content of the continuous reinforcing fibers in the thickness direction of the gas barrier layer, it is assumed that, by allowing a proportion of the continuous reinforcing fibers in the very thin outer region, which is up to 0.1% from the outer side in the thickness direction, to be relatively high, mechanical properties of the pressure vessel are further improved. Of the continuous reinforcing fibers in the thickness direction of the gas barrier layer, by setting the continuous reinforcing fiber content (vol. %) in the central region, which is between up to more than 0.1% from the inner side in the thickness direction and up to more than 0.1% from the outer side in the thickness direction, to be dense, that is from 30 to 70 vol. %, and by varying the content of the continuous reinforcing fibers in the thickness direction of the gas barrier layer incrementally or by gradation, it is assumed that bubbles tend to be released thereby reducing a void rate and firming the body part having excellent gas barrier properties.

The details of the present embodiments will be described below.

Figure 2:
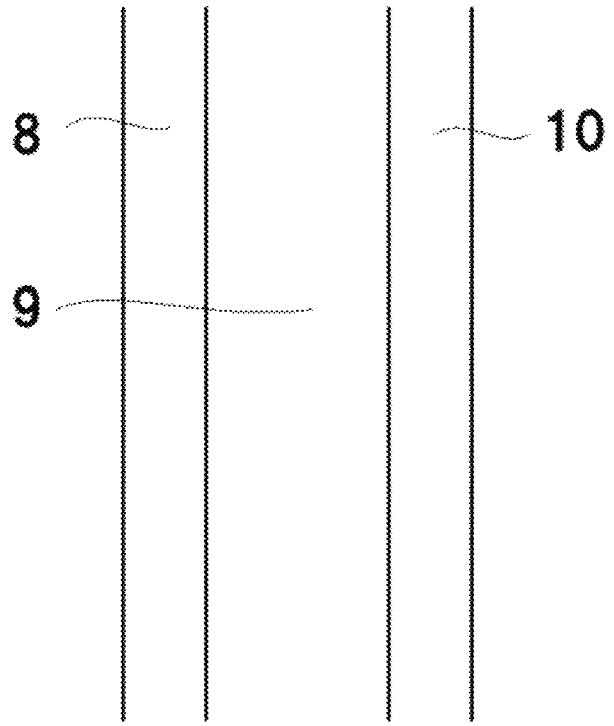
FIG. 2 is a cross-sectional magnified view of a layer (gas barrier layer) made of a fiber-reinforced resin material including a resin component and a continuous reinforcing fiber contained in the body part of a pressure vessel.

FIG. 1 is a cross-sectional schematic view illustrating an example of a pressure vessel according to the present embodiment. FIG. 2 is a cross-sectional magnified view of a layer (gas barrier layer) made of a fiber-reinforced resin material containing a resin component and continuous reinforcing fibers included in a body part of a pressure vessel.

In FIG. 1, 1 indicates a pressure vessel, 2 indicates a body part, 3 indicates an inner layer, 4 indicates an outer layer, 5 indicates a mouthpiece, 6 indicates a boss, and 7 indicates a valve, and in FIG. 2, 8 indicates an inner region, 9 indicates a central region, and 10 indicates an outer region. FIGS. 1 and 2 are schematic views, and the scale thereof is not necessarily equivalent to the actual value.

The gas barrier layer of the present embodiments is, for example, a layer constituting the body part 2 of the pressure vessel 1 in FIG. 1, and the gas barrier layer may be any one of the inner layer 3 or the outer layer 4 but is preferably the outer layer 4. Furthermore, the pressure vessel illustrated in FIG. 1 has a two-layer structure of the inner layer 3 and the outer layer 4 but may further include other layers. Those other layers will be described below.

First, the gas barrier layer will be described. The gas barrier layer in the present embodiments is a layer made of a fiber-reinforced resin material containing a resin component and continuous reinforcing fibers. The gas barrier layer is typically formed in a manner that the fiber-reinforced resin material covers the body part 2. With such a configuration, the amount of gas permeating through the pressure vessel described below can be made less. The continuous reinforcing fibers are preferably regularly arranged in the gas barrier layer. Being regularly arranged means that 70 mass % or more (preferably 80 mass % or more, more preferably 90 mass % or more, and even more preferably 95 mass % or more) of the continuous reinforcing fibers in the gas barrier layer are aligned with constant directionality. Examples of the constant directionality include in a spiral shape, in a longitudinal direction, in a lateral direction, or a combination thereof. Note that, in the present embodiment, the spiral shape, the longitudinal direction, and the lateral direction are intended to include, in addition to a strict arrangement in a spiral-shape or the like, a degree of error generally interpreted by a person skilled in the art. By the regular arrangement in this manner, a region having no continuous reinforcing fibers in the surface of the body part of the gas harrier layer (pressure vessel) can be made as small as possible, and thus the gas barrier properties tend to further enhance. In the gas barrier layer in the present embodiment, typically, the continuous reinforcing fibers are arranged in a manner that the continuous reinforcing fibers are present in 97 mass % or more (preferably 99 mass % or more) in the surface.

Furthermore, a plurality of types of continuous reinforcing fibers may be used for one pressure vessel. For example, by arranging glass fibers on arranged carbon fibers, impact resistance can be enhanced.

As illustrated in FIG. 2, the gas barrier layer in the present embodiments has different contents of continuous reinforcing fibers in the inner region 8, the central region 9, and the outer region 10.

Specifically, the inner region 8 means a region that is from an inner side of the body part to 0.1% in a thickness direction. The central region 9 means a region that is in between up to more than 0.1% from the inner side of the body part in the thickness direction and up to more than 0.1% from the outer side in the thickness direction. The outer region 10 means a region up to 0.1% from an outer side of the body part in the thickness direction.

The ratio (inner region/outer region) of the content (vol. %) of the continuous reinforcing fibers in the inner region 8 to the content (vol. %) of the continuous reinforcing fibers in the outer region 10 is from 0.80 to 0.99. By setting the ratio to not less than the lower limit value, occurrence of cracks tends to be suppressed. Furthermore, by setting the ratio to not more than the upper limit value, mechanical properties tend to be superior.

The content (vol. %) in the continuous reinforcing fibers in the inner region 8/the content (vol. %) in the continuous reinforcing fibers in the outer region 10 is preferably 0.85 or more, more preferably 0.90 or more, and even more preferably 0.95 or more.

Furthermore, in the gas barrier layer, the ratio (outer region/central region) of the continuous reinforcing fiber content (vol. %) in the outer region 10 to the continuous reinforcing fiber content (vol. %) in the central region 9 is preferably from 1.01 to 1.11, and more preferably from 1.01 to 1.07. Furthermore, in the gas barrier layer, the ratio (inner region/central region) of the continuous reinforcing fiber content (vol. %) in the inner region 8 to the continuous reinforcing fiber content (vol. %) in the central region 9 is preferably from 0.95 to 1.05, more preferably 0.95 or more and less than 1.00, and even more preferably 0.96 or more and less than 1.00. With such ratios, the effect of the present invention is more effectively exhibited.

Furthermore, in the gas barrier layer in the present embodiment, the continuous reinforcing fiber content (vol. %) in the central region 9 is from 30 to 70 vol. %. By setting the content to not less than the lower limit value, superior mechanical properties can be achieved. Furthermore, by setting the content to not more than the upper limit value, the void rate can be made smaller. The continuous reinforcing fiber content of the central region 9 is preferably 33 vol. % or more, and more preferably 36 vol. % or more, and more preferably 65 vol. % or less.

In the present embodiment, the central region 9 may have a constant content of the continuous reinforcing fibers in the thickness direction or the content may be increased gradually from the inner region to the outer region.

Furthermore, in the gas barrier layer in the present embodiment, the continuous reinforcing fiber content (vol. %) in the inner region 8 is preferably 29 vol. % or more, more preferably 32 vol. % or more, and even more preferably 35 vol. % or more, and preferably 69 vol. % or less, and more preferably 64 vol. % or less. By setting the content to not less than the lower limit value, mechanical properties tends to be superior. Furthermore, by setting the content to not more than the upper limit value, the void rate tends to be smaller.

Furthermore, in the gas barrier layer according to the present embodiment, the continuous reinforcing fiber content (vol. %) in the outer region 10 is preferably 30 vol. % or more, more preferably 33 vol. % or more, even more preferably 36 vol. % or more, and preferably 70 vol. % or less, and more preferably 65 vol. % or less. By setting the content to not less than the lower limit value, mechanical properties tends to be superior. Furthermore, by setting the content to not more than the upper limit value, the void rate tends to be smaller, In the gas barrier layer according to the present embodiment, the compositions of continuous reinforcing fibers constituting the inner region 8, the central region 9, and the outer region 10 may be the same or different. In the present embodiment, 95 mass % or more (preferably 99 mass % or more) of the compositions of the continuous reinforcing fibers constituting the inner region 8, the central region 9, and the outer region 10 are preferably the same.

The gas barrier layer may contain only one type of continuous reinforcing fiber or may contain two or more types of continuous reinforcing fibers. When two or more types of mold release agents are contained, the total amount thereof is preferably in the above range.

The thickness of the gas barrier layer in the present embodiments is preferably 1 cm or more, more preferably 3 cm or more, and even more preferably 4 cm or more, per one layer of the gas barrier layer. Furthermore, the thickness is preferably 15 cm or less, more preferably 10 cm or less, and even more preferably 8 cm or less.

Furthermore, the thickness of the body part (the total thickness of one layer or two or more layers of gas barrier layers and another layer) in the present embodiments is preferably 1 cm or more, more preferably 3 cm or more, and even more preferably 4 cm or more. Furthermore, the thickness is preferably 30 cm or less, more preferably 20 cm or less, and even more preferably 15 cm or less, and may be 10 cm or less, or 6 cm or less.

In the gas barrier layer in the present embodiment, the void rate is preferably 1 vol. % or less. The void rate indicates a proportion of bubbles (voids) contained in the gas barrier layer and is measured in accordance with the method described in the examples below. By such a low void rate, permeating gas amount tends to be even lower. The void rate is preferably 0.7 vol. % or less, more preferably 0.5 vol. %) or less, even more preferably 0.3 vol. %) or less, and yet even more preferably less than 0.1 vol. %. The lower limit value of the void rate is ideally 0.

Examples of the method of reducing the void rate include adjustment of continuous reinforcing fiber content, viscosity adjustment of a resin, adjustment of a molding temperature, and adjustment of winding angle or creel tension at the time of filament winding.

Next, a layer structure of the body part of the pressure vessel of the present embodiments will be described.

The pressure vessel of the present embodiments may contain only the gas barrier layer in the body part or may contain another layer as described above.

An example of the pressure vessel of the present embodiments is an aspect in which the body part includes no layer in the inner side of the gas barrier layer (aspect 1). The gas barrier layer in the aspect 1 functions as a liner and also plays a role as an outer layer reinforcing the liner. The gas barrier layer used in the present embodiments is less likely to cause cracks and less likely to be affected by expansion, shrinkage, and the like of the vessel due to charge and use of a gas, and thus is suitably used.

Furthermore, in the aspect 1, the body part may consist only of one or two layers of the gas barrier layers or may have a layer on the outer side of the gas barrier layer. Examples of the layer on the outer side include a second gas barrier layer, a design layer, a metal layer (e.g., aluminum layer), and a fiber-reinforced resin layer other than the gas barrier layer. For example, a resin component constituting a first gas barrier layer can contain a thermosetting resin and a resin component constituting a second gas barrier layer can contain a thermoplastic resin. With such a configuration, a pressure vessel having both of the merits of a thermosetting resin and the merits of a thermoplastic resin can be formed.

In the pressure vessel of the present embodiment, in addition to the gas barrier layer satisfying the ratio of the inner region/outer region and the like, another layer having gas barrier properties that does not satisfy the ratio of the inner region/outer region and the like may be contained.

The gas barrier layer may be an inner layer (e.g., liner) or may be an outer layer provided on the outer side of a liner made of a resin. The gas barrier layer is preferably an inner layer and more preferably an innermost layer.

The total thickness of the body part in the aspect 1 is preferably 1 cm or more, more preferably 3 cm or more, and even more preferably 4 cm or more. Furthermore, the total thickness is preferably 20 cm or less, more preferably 18 cm or less, and even more preferably 16 cm or less.

Another example of the pressure vessel of the present embodiments is an aspect in which the body part includes another layer in the inner side of the gas barrier layer (aspect 2). Examples of this other layer in the aspect 2 include liners, and adhesive layers each provided in between a liner and the gas barrier layer. Examples of the aspect 2 include an aspect in which a liner and a gas barrier layer that is in contact with the liner are contained. In the aspect 2, another layer may be further contained in the outer side of the gas barrier layer. In this case, examples of such another layer include design layers.

Examples of the liner in the aspect 2 include liners made of metals and liners made of resins, and liners made of resins are preferred. When the liner made of a resin is used and when a resin component constituting the gas barrier layer is a thermosetting resin, a resin component of the liner made of a resin is preferably a thermoplastic resin. Furthermore, when the liner made of a resin is used and when a resin component constituting the gas barrier layer is a thermoplastic resin, a resin component of the liner made of a resin is also preferably a thermoplastic resin.

The thickness of the liner in the aspect 2 is preferably 100 μm or more, more preferably 200 μm or more, and even more preferably 500 μm or more. Furthermore, the thickness is preferably 10000 μm or less, more preferably 7000 μm or less, and even more preferably 5000 μm or less.

The total thickness of the body part in the aspect 2 is preferably 1 cm or more, more preferably 3 cm or more, and even more preferably 4 cm or more. Furthermore, the total thickness is preferably 20 cm or less, more preferably 18 cm or less, and even more preferably 16 cm or less.

Furthermore, the pressure vessel of the present embodiments includes a mouthpiece 5, a boss 6, a valve 7, and the like in addition to the body part 2 containing the gas barrier layer as illustrated in FIG. 1. Furthermore, in a form extending the body part, dome parts that seal the mouthpiece 5 side and the boss 6 side of the body part are included. The dome part is typically formed by the composition that is the same as the body part (inner layer 3, inner layer 4) and the like.

In addition, an attachment/detachment part (not illustrated) for attaching and detaching with another member can be also provided.

The fiber-reinforced resin material constituting the gas barrier layer will be described next.

The gas barrier layer in the present embodiments is a layer made of a fiber-reinforced resin material containing a resin component and continuous reinforcing fibers. By using the continuous reinforcing fibers, gas barrier properties can be enhanced, and higher strength of the pressure vessel can be achieved. Furthermore, it is not possible to fill the gaps completely only with the continuous reinforcing fibers however, by providing a resin component, such gaps can be filled tightly.

The fiber-reinforced resin material in the present embodiments contains a resin component. The resin component may be a thermoplastic resin, a thermosetting resin, or a mixture of these. An example of the aspect of the resin component is an aspect in which the resin component contains a thermoplastic resin and 90 mass % or more of the resin component is the thermoplastic resin. Another example of the aspect of the resin component is an aspect in which the resin component contains a thermosetting resin and 90 mass % or more of the resin component is the thermosetting resin.

Examples of the thermosetting resin include epoxy resins, phenol resins, (meth)acrylate resins, unsaturated polyester resins, diallyl phthalate resins, cyanate resins, and maleimide resins, and epoxy resins are preferred.

In the case where an epoxy resin is used, as the resin component, an epoxy resin composition containing an epoxy resin and an epoxy resin curing agent containing a reaction product of a component (x1) and a component (x2) described below is preferably used.

(x1) At least one selected from the group consisting of m-xylylenediamine and p-xylyienediamine.

(x2) At least one selected from the group consisting of unsaturated carboxylic acids represented by Formula (1) and derivatives thereof.

(1)

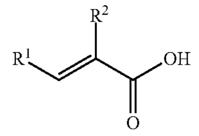

In Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

In addition, as the epoxy resin composition, the epoxy resin composition described in JP 2017-008316 A and the epoxy resin composition described in JP 2016-190920 A, the contents of which are incorporated herein by reference, can also be used.

Examples of the thermoplastic resin include polyolefin resins, polyethylene resins, polypropylene resins, polyamide resins, acrylonitrile-butadiene-styrene copolymer (ABS) resins, polybutylene terephthalate resins, polyacetal resins, and polycarbonate resins, and polyamide resins are preferred. The polyamide resin may be an aliphatic polyamide resin or a semi-aromatic polyamide resin, and is preferably a semi-aromatic polyamide resin. The semi-aromatic polyamide resin is preferably a polyamide resin containing diamine-derived structural units and dicarboxylic acid-derived structural units, 50 mol % or more (preferably 70 mol % or more, and more preferably 90 mol % or more) of the diamine-derived structural units are derived from xylylenediamines, and 50 mol % or more of the dicarboxylic acid-derived structural units are structural units derived from am-linear aliphatic dicarboxylic acids having from 4 to 20 carbons (preferably, structural unit derived from at least one type of adipic acid, sebacic acid, and dodecanedioic acid).

The resin component preferably has a low hydrogen permeability coefficient. Due to the low hydrogen permeability coefficient, the resin composition can be preferably used as a pressure vessel for a hydrogen gas. The hydrogen permeability coefficient of the resin component is preferably $15.0\times10^{-11}$ cc·cm/(cm$^2$·s·cmHg) or less, more preferably $12.0\times10^{-11}$ cc·cm/(cm$^2$·s·cmHg) or less, even more preferably $5.0\times10^{-11}$ cc·cm/(cm$^2$·s·cmHg) or less, yet even more preferably $3.0\times10^{-11}$ cc·cm/(cm$^2$·s·cmHg) or less, and yet even more preferably $2.5\times11^{-11}$ cc·cm/(cm$^2$·s·cmHg) or less. The lower limit value is ideally 0 but is practically $1.0\times10^{-11}$ cc·cm/(cm$^2$·s·cmHg) or more.

When the resin component contains two or more types of resins, the hydrogen permeability coefficient is a hydrogen permeability coefficient of the mixture.

In the present embodiment, the resin component may contain other components within a range that does not depart from the spirit of the present invention. Specific examples include additives such as coupling agents, reactive diluents, solvents, reactive diluents other than solvents, curing accelerators, humectants, tackifiers, antifoaming agents, delustering agents, anticorrosives, lubricants, coloring agents, oxygen scavengers, UV absorbers, antioxidants, plasticizers, dispersing agents, flame retarders, antistatic agents, coloration inhibitors, and antigelling agents. The total amount of these is preferably 10 mass % or less of the resin component.

In the present embodiment, the fiber-reinforced resin material contains continuous reinforcing fibers.

The continuous reinforcing fibers used in the gas barrier layer of the present embodiments are reinforcing fibers having a fiber length of more than 100 mm.

Examples of the shape of the continuous reinforcing fibers include tow, string, filament, sheet, and tape shapes, and the continuous reinforcing fibers constituting a sheet or tape include, for example, unidirectional (UD) materials, textiles, and non-woven fabrics.

The number of filaments of the continuous reinforcing fibers in the fiber-reinforced resin material is preferably 2400 or more and preferably 240000 or less. By setting the number to not lower than the lower limit value, superior productivity tends to be achieved. By setting the number to not higher than the upper limit value, superior moldability tends to be achieved.

The average fiber length of the continuous reinforcing fiber bundle is not particularly limited, but from the viewpoint of molding processability, the average fiber length is preferably cm or more, more preferably 1 m or more, and even more preferably 100 m or more, and preferably 10000 m or less.

From the viewpoint of molding processability and the viewpoint of easily obtaining a high strength and a high elastic modulus, the average fineness of the continuous reinforcing fiber bundle is preferably 50 tex (g/1000 m) or more, more preferably 200 tex or more, even more preferably 500 tex or more. Furthermore, the average fineness is preferably 2000 tex or less, more preferably 1500 tex or less, and even more preferably 1000 tex or less.

Also, the average tensile modulus of the continuous reinforcing fiber bundle is preferably 50 GPa or more and preferably 1000 GPa or less.

Examples of materials of the continuous reinforcing fibers include inorganic fibers, such as glass fibers, carbon fibers, metal fibers, boron fibers, basalt fibers, and ceramic fibers; and organic fibers, such as aramid fibers, polyoxymethylene fibers, aromatic polyamide fibers, polyparaphenylene benzobisoxazole fibers, and ultra-high molecular weight polyethylene fibers. Among these, inorganic fibers are preferable from the viewpoint of obtaining a high strength, and at least one type selected from the group consisting of glass fibers, carbon fibers, and basalt fibers is more preferable because of the fibers being lightweight with high strength and a high elastic modulus, and carbon fibers are even more preferable.

Examples of carbon fibers include polyacrylonitrile-based carbon fibers and pitch-based carbon fibers. In addition, a carbon fiber made from a plant-derived raw material, such as lignin or cellulose, can also be used.

The continuous reinforcing fibers used in the present embodiments may be treated with a treatment agent. Examples of the treatment agent include a surface treatment agent or a sizing agent.

A silane coupling agent is preferable as the surface treatment agent. Examples of the silane coupling agent include a silane coupling agent having a vinyl group, a silane coupling agent having an amino group, a silane coupling agent having an epoxy group, a silane coupling agent having a (meth)acrylic group, and a silane coupling agent having a mercapto group.

Examples of the sizing agent include urethane-based sizing agents, epoxy-based sizing agents, acrylic-based sizing agents, polyester-based sizing agents, vinyl ester-based sizing agents, polyolefin-based sizing agents, polyether-based sizing agents, and carboxylic acid-based sizing agents, and of these, one type of sizing agent can be used, or two or more types of the sizing agents can be used in combination. Examples of combinations of two or more sizing agents include urethane/epoxy-based sizing agents, urethane/acrylic-based sizing agents, and urethane/carboxylic acid-based sizing agents.

Among these, from the viewpoints of improving the interfacial adhesiveness to the cured product of a thermosetting resin, and particularly of an epoxy resin composition, and further improving the strength and impact resistance of the obtained gas barrier layer, the continuous reinforcing fibers are preferably treated with one or more types selected from the group consisting of urethane-based sizing agents, epoxy-based sizing agents, and urethane/epoxy-based sizing agents, and are more preferably treated with an epoxy-based sizing agent.

From the viewpoints of improving the interfacial adhesiveness to a cured product of a thermosetting resin or a thermosetting resin composition and further improving the strength and impact resistance of the obtained gas barrier layer, the amount of the treatment agent is preferably from 0.001 to 5 mass %, more preferably from 0.1 to 3 mass %, and even more preferably from 0.5 to 2 mass %, relative to the amount of the continuous reinforcing fibers.

Commercially available products can be also used as the continuous reinforcing fibers. Examples of commercially available products of carbon fibers that are continuous reinforcing fibers include Torayca (trade name) fibers of the series "T300", "T300B", "T400HB", "T700SC", "T800SC", "T800HB", "T830HB", "T1000GB", "T100GC", "M35JB", "M40JB", "M46JB", "M50JB", "M55J", "M55JB", "M60JB", "M30SC", and "Z600", and Torayca Cloth (trade name) of the series "CO6142", "CO6151B", "CO6343", "CO6343B", "CO6347B", "CO6644B", "CK6244C", "CK6273C", and "CK6261C", the "UT70" series, the "UM46" series, and the "BT70" series, available from Toray Industries, Inc.

From the viewpoint of achieving effect of the present embodiment, in the fiber-reinforced resin material of the present embodiment, the total amount of the resin component (including the additives described above) and the continuous reinforcing fibers is preferably 90 mass % or more, more preferably 95 mass % or more, and even more preferably 99 mass % or more, and the upper limit is 100 mass %.

Next, the production method of the pressure vessel will be described.

The pressure vessel of the present embodiments can be produced by a known method. In particular, the body part is formed by a blading method, a winding method, a 3D printing method, or the like using the fiber-reinforced resin material. At this time, the fiber-reinforced resin material is preferably a material, in which continuous reinforcing fibers are regularly arranged in one direction or two or more directions and the continuous reinforcing fibers are impregnated with a resin component. Representative examples thereof include prepregs.

The body part is typically formed by molding the fiber-reinforced resin material in a manner that the continuous reinforcing fibers are present in a cylindrical form with substantially no gaps as described above.

In the present embodiment, to achieve the continuous reinforcing fiber contents of the inner region, the central region, and the outer region, and the thickness of the gas barrier layer as described above, a known means can be used for adjustment.

Specific examples thereof include a method of adjusting a fiber-reinforced resin material. That is, in a filament winding molded product, typically, the inner side is tighter and has a higher proportion of the continuous reinforcing fibers, because the resin fluidity at normal temperature is high. Furthermore, typically, when a wrapping film is wound at the end, the resin in the outer side flows out, and thus the proportion of the continuous reinforcing fibers in the outer side becomes high. In the present embodiment, for example, by using a resin having a high resin viscosity at normal temperature, the proportion of the continuous reinforcing fibers in the inner side can be made lower than that of the outer side. As such a resin component, an example is an epoxy resin composition containing the epoxy resin described above and the epoxy resin curing agent containing the reaction product of the component (x1) and the component (x2) described above. Furthermore, also by using a tow prepreg, the inner region is less likely to be squeezed and the resin in the outer side is less likely to flow out, and the proportions of the continuous reinforcing fibers in the inner region and the outer region can be adjusted.

Furthermore, when the body part in a cylindrical form is formed by the fiber-reinforced resin material, the winding method thereof can be devised. Specific examples thereof include, by using a tape-like or string-like material as the fiber-reinforced resin material, adjusting the winding angle thereof; adjusting heating conditions when molding and processing of the fiber-reinforced resin material into the body part; and adjusting the tension when winding the fiber-reinforced resin material. An example is a method for producing a pressure vessel including winding a fiber-reinforced resin material containing a resin component and continuous reinforcing fibers in a cylindrical form, a tension of the fiber-reinforced resin material when winding in the cylindrical form is from 0.01 gf to 3 gf (preferably 0.05 to 2.5 gf) per one strand of continuous reinforcing fiber.

Note that examples of the cylindrical form includes a form in which a cross-section perpendicular to the length direction of the tube is circle; however, those having an oval cross-section are also included within a range that does not depart from the spirit of the present invention.

The pressure vessel of the present embodiments can be suitably used as a high-pressure gas storage tank. The gas to be stored in the high-pressure gas storage tank may be any material that is a gas at 25° C. and 1 atm, and examples thereof include hydrogen, oxygen, carbon dioxide, nitrogen, argon, LPG, alternative chlorofluorohydrocarbons, and methane. Among these, the gas is preferably hydrogen.

The pressure vessel of the present embodiments has excellent gas barrier properties such as a hydrogen gas barrier property, as well as a lightweight design and excellent pressure resistance and impact resistance.

In the high-pressure gas storage tank of the present embodiment, the body part may consist only of the gas barrier layer or may include the gas barrier layer and other layer(s). For these details, the description of the body part described above can be referenced. The gas barrier layer of the present embodiments has excellent pressure resistance and impact resistance, and thus, even when other layers are provided, the thickness can be maintained at a thin level.

EXAMPLES

The present invention will be described more specifically with reference to examples below. Materials, amounts used, proportions, processing details, processing procedures, and the like described in the following examples can be appropriately changed as long as they do not depart from the spirit of the present invention. Thus, the scope of the present invention is not limited to the specific examples described below.

If a measuring device used in the examples is not readily available due to discontinuation or the like, another device with equivalent performance can be used for measurement.

1. Raw Material

Preparation of Amine-Based Epoxy Resin Curing Agent A

A reaction vessel was charged with 1 mol of meta-xylylenediamine. The temperature was raised to 60° C. under a nitrogen stream, and 88 mol of methyl acrylate was added dropwise over 1 hour. The temperature was raised to 165° C. while generated methanol was distilled off, and then the temperature was maintained at 165° C. for 2.5 hours.

Methanol was added dropwise over 1.5 hours in a manner that the solid content concentration became 65 mass % and cooled to 65° C., then 0.27 mol of molten ethylene carbonate was added dropwise over 30 minutes, the temperature was maintained at 65° C. for 5 hours, and thus an amine-based epoxy resin curing agent A was obtained.

Preparation of Amine-Based Epoxy Resin Curing Agent B

A reaction vessel was charged with 1 mot of meta-xylylenediamine. The temperature was raised to 60° C. under a nitrogen stream, and 93 mol of methyl acrylate was added dropwise over 1 hour. The temperature was raised to 165° C. while generated methanol was distilled off, and then the temperature was maintained at 165° C. for 2.5 hours. Methanol was added dropwise over 1.5 hours in a manner that the solid content concentration became 65 mass % and cooled to 65° C., and thus an amine-based epoxy resin curing agent B was obtained.

Preparation of Resin Component A1

In the amine-based epoxy resin curing agent A, methanol and TETRAD-X (epoxy resin, available from Mitsubishi Gas Chemical Company, Inc.) were added in a manner that the solid. content concentration became 40 mass % and the number of active amine hydrogen/number of epoxy groups in epoxy resin in the amine-based epoxy resin curing agent became 1.0, and adequately agitated.

Preparation of Resin Component A2

In the amine-based epoxy resin curing agent A, methanol and TETRAD-X (epoxy resin, available from Mitsubishi Gas Chemical Company, Inc.) were added in a manner that the solid content concentration became 40 mass % and the number of active amine hydrogen/number of epoxy groups in epoxy resin in the amine-based epoxy resin curing agent became 1.2, and adequately agitated.

Preparation of Resin Component B

In the amine-based epoxy resin curing agent B, methanol and TETRAD-X (epoxy resin, available from Mitsubishi Gas Chemical Company, Inc.) were added in a manner that the solid content concentration became 40 mass % and the number of active amine hydrogen/number of epoxy groups in epoxy resin in the epoxy resin curing agent became 1.0, and adequately agitated.

Preparation of Resin Component C

In jER 828 (epoxy resin, available from Mitsubishi Chemical Corporation), diaminodiphenylethane (available from Tokyo Chemical Industry Co., Ltd.) was added as an amine-based epoxy resin curing agent in a manner that the number of active amine hydrogen/number of epoxy groups in epoxy resin in the amine-based epoxy resin curing agent became 1.0, and adequately agitated.

Preparation of Resin Component D

In jER 828, isophorone diamine (available from Tokyo Chemical Industry Co., Ltd.) was added as an amine-based epoxy resin curing agent in a manner that the number of active amine hydrogen/number of epoxy groups in epoxy resin in the epoxy resin curing agent became 1.0, and adequately agitated.

Carbon fibers: continuous carbon fibers “Torayca T800SC-24000”, available from Toray Industries, Inc. (number of filaments: 24000, fiber fineness: 1030 tex, tensile modulus: 294 GPa)

Measurement of Hydrogen Permeability Coefficient of Resin Component [cc·cm/(cm$^2$·s·cmHg)]

The hydrogen permeability coefficient of each of the resin components A to D was measured as a value in a dried state (relative humidity: 0%) at 23° C. by forming the resin into a test piece having a thickness of 100 μm and by using a water vapor permeability measuring device.

Specifically, a bar coater was used to apply each of the resin components A to D onto a smooth metal plate coated with a mold release agent. The resin component was applied in a 200 mm square at a thickness of 100 μm and then heated and cured at 100° C. for 5 minutes to produce a cured product. The hydrogen gas permeability coefficient of this cured product was measured in a dried state at 23° C. by using a water vapor permeability measuring device.

As the water vapor permeability measuring device, “G2700T·F”, available from GTR Tee Corporation, was used.

Examples 1 to 9 and Comparative Example 1

Production of Pressure Vessel

The resin component and continuous carbon fibers listed in Table 1 or Table 2 were used.

The continuous carbon fibers were impregnated with the resin component, then the obtained product was dried by heating for 80 seconds in a hot air dryer at 80° C., and a tow prepreg was produced. Then, by a filament winding method, a tow prepreg was wound around a high-density polyethylene liner (thickness: 500 μm) having a diameter of 500 mm and a length of 1000 mm and having a hemispherical shape art both ends in a manner that the continuous carbon fibers had a spiral structure and the tension of the continuous carbon fibers per one strand of carbon fiber was 1.2 gf. Heat-curing was performed at 100° C. for 180 minutes, a pressure vessel having an outer diameter of 600 mm and a length of 1100 mm was obtained. At this time, the contents of the continuous reinforcing fibers in the inner region, the central region, and the outer region in the body part and the thickness of the gas barrier layer were adjusted to the values listed in Table 1 or Table 2.

Volume Content of Reinforcing Fibers and Ratio Thereof

The reinforcing fiber volume contents (inner side, central, outer side) (vol. %) in the body part were measured by the following method.

From the outer side to the inner side of the body part, the body part was cut perpendicular to the central part of the body part form the length direction (direction of arrow A in FIG. 1), and a test piece of the inner side, the central, and the outer side at a target position was cut out. The cut-out test piece was embedded in an epoxy resin, and a cut face of the embedded test piece was polished, and the cross-sectional view was photographed using an ultra-deep color 3D shape measuring microscope. In the obtained cross-sectional image, the continuous reinforcing fiber regions at the inner side region, the central region, and the outer region were selected by using the image analysis software, and the total area for each region was measured. The reinforcing fiber volume content was shown as a total area/photographed cross-sectional area (unit: %) in the continuous reinforcing fibers. This measurement was repeated for five times, and a number average value thereof was used.

For the ultra-deep color 3D shape measuring microscope, a VK-9500 (controller section)/VK-9510 (measurement section) (available from Keyence Corporation) was used. As the image analysis software, Image) was used.

Note that, as illustrated in the schematic view of FIG. 2, in the cross-section of the gas barrier layer, the inner region refers to a region (inner region 8) that is from the inner side of the body part to 0.1% in the thickness direction, the central region means a region (central region 9) that is in between up to more than 0.1% from the inner side of the body part in the thickness direction and up to more than 0.1% from the outer side in the thickness direction, and the outer region means a region (outer region 10) up to 0.1% from the outer side of the body part in the thickness direction.

Amount of Gas Permeated Through Pressure Vessel in 24 Hours [$cm^3$]

In the pressure vessel, 30 MPa of hydrogen gas was charged and allowed to stand still at room temperature at normal pressure for 24 hours. Based on the internal pressure at the time when 24 hours had passed, the amount of permeated gas was calculated.

Void Rate of Gas Barrier Layer (vol. %)

A 1 cm×1 cm sample was cut out from the obtained body part, and a cross-sectional image was taken by X-ray. In the obtained cross-sectional image, voids in the gas barrier layer of the body part were selected using the image analysis software, and the surface area was measured. An area of void region/area of photographed region (unit: %) was shown as the void rate.

For the measurement of the cross-sectional image, an X-ray CT-scan (TDM 100014-II, available from Yamato Scientific Co., Ltd.) was used. As the image analysis software, Azo-Kun (available from Asahi Kasei Engineering Corporation) was used.

Fatigue Characteristics During Water Absorption

After the outer face of the vessel was immersed in water for 10 days, a test piece was cut out. By using Fatigue Tester B-70 (available from Toyo Seiki Seisaku-sho, Ltd.), fatigue test was performed at a stress of 100 $kg/mm^2$ at 23° C. The conditions until a crack occurred were evaluated as described below.

Five experts conducted the evaluation, and the result was determined based on a majority vote.

A: Adequate time was ensured until a crack occurred (practical level).

B: Not A or C (practical level).

C: A crack occurred immediately (not practical level).

Internal Pressure Fatigue Characteristics

A hydraulic jack was installed for an electro-hydraulic servo fatigue testing machine, and the electro-hydraulic servo fatigue testing machine was connected to a vessel through high-pressure piping, and then a pressure medium was introduced. By vibrating the fatigue testing machine, 30 MPa of internal pressure fatigue load was applied to the vessel. The operation was repeated until a crack occurred, and the conditions until a crack occurred were evaluated as described below.

Five experts conducted the evaluation, and the result was determined based on a majority vote.

A: Adequate time was ensured until a crack occurred (practical level)

B: Not A or C (practical level).

C: A crack occurred immediately.

Example 10

A pressure vessel liner and a high-presage gas storage tank were produced in the following manner.

Production of Body Part of Liner

A1 was used as a thermosetting resin, and carbon fibers were used as continuous reinforcing fibers.

The continuous carbon fibers were impregnated with the A1, then the obtained product was dried by heating for 80 seconds in a hot air dryer at 80° C., and a tow prepreg was produced. Next, the tow prepreg was braided through a braiding method on a hollow metal mandrel having a diameter of 500 trim and a length of 1000 mm such that the tow prepreg had a braided structure, and a cylindrical prepreg having an outer diameter of 600 mm, a length of 1100 mm, and a thickness of 50 mm was produced. This cylindrical prepreg was heated and cured at 120° C. for 30 minutes on the metal mandrel, after which the metal mandrel was removed, and a liner body part constituted from a carbon fiber-reinforced composite material was produced. At this time, the contents of the continuous reinforcing fibers in the inner region, the central region, and the outer region in the body part and the thickness (thickness of the gas barrier layer) were adjusted to the values listed in Table 2.

Production of Dome Portion of Liner

The resin component A1, and the "Torayca Cloth UT70-30G" (unidirectional cloth, sheet thickness of 0.167 mm) continuous carbon fibers available from Toray Industries, Inc. as the continuous reinforcing fibers were used.

The continuous carbon fibers were impregnated with the resin component A1, then the obtained product was dried by heating for 80 seconds in a hot air dryer at 80° C., and a prepreg was produced. Next, a mold was used to produce a hollow dome portion having an opening with a diameter of 50 mm and a hollow dome portion not having an opening by a hot press molding method at a pressing pressure of 0.5 MPa, a pressing temperature of 140° C., and a pressing time of 120 minutes. These dome portions each had an outer diameter of 300 mm, a dome portion height of 125 mm, and a thickness of 25 mm, and the volume fraction (Vf) of continuous carbon fibers was 59.1%.

Production of Liner and High-Pressure Gas Storage Tank

The liner was obtained by joining the dome portions to both ends of the liner cylindrical portion obtained by the method described above by bolts. Furthermore, the same tow prepreg as that used in the production of the body part of the liner was wound around the outer surface of the liner by a filament winding method, and then heated at 120° C. for 240 minutes to form an outer layer having a thickness of 60 mm, and a high-pressure gas storage tank was obtained.

Evaluation was performed in the same manner as in Example 1. However, for the volume contents and ratios of the continuous reinforcing fibers and the void rate, values for the liner part were measured, fatigue characteristics during water absorption and internal pressure fatigue characteristics was obtained.

REFERENCE SIGNS LIST

1 Pressure vessel
2 Body part
3 Inner layer
4 Outer layer

TABLE 1

| | Example 1 | Example 2 | Example 3 | Example 4 | Example 5 | Example 6 |
|---|---|---|---|---|---|---|
| Resin component | A1 | A2 | B | C | D | A1 |
| Hydrogen permeability coefficient of resin [cc•cm/(cm3•s•cmHg)] | $2.2 \times 10^{-11}$ | $2.4 \times 10^{-11}$ | $3.9 \times 10^{-11}$ | $9.9 \times 10^{-11}$ | $11 \times 10^{-11}$ | $2.2 \times 10^{-11}$ |
| Type of reinforcing fibers | Carbon fiber | Carbon fiber | Carbon fiber | Carbon fiber | Carbon fiber | Carbon fiber |
| Reinforcing fiber volume content (outer region) [vol. %] | 60.8 | 61.1 | 58.8 | 60.4 | 62.1 | 40.4 |
| Reinforcing fiber volume content (central region) [vol. %] | 59.9 | 60.2 | 58.4 | 59.2 | 61.8 | 39.4 |
| Reinforcing fiber volume content (inner region) [vol. %] | 59.1 | 59.7 | 57.9 | 59.1 | 60.6 | 39.1 |
| Ratio of continuous reinforcing fiber contents (vol. %) (inner region/outer region) | 0.97 | 0.98 | 0.98 | 0.98 | 0.9% | 0.97 |
| Ratio of continuous reinforcing fiber contents (vol. %) (outer region/central region) | 1.02 | 1.01 | 1.01 | 1.02 | 1.00 | 1.03 |
| Ratio of continuous reinforcing fiber contents (vol. %) (inner region/central region) | 0.99 | 0.99 | 0.99 | 1.00 | 0.98 | 0.99 |
| Thickness of gas barrier layer [cm] | 5 | 5 | 5 | 5 | 5 | 5 |
| Amount of gas permeated through pressure vessel in 24 hours [$cm^3$] | 101 | 110 | 179 | 453 | 504 | 131 |
| Void rate of gas barrier layer [vol. %] | 0.1> | 0.1> | 0.1 | 0.1> | 0.1> | 0.1> |
| Fatigue characteristics during water absorption | A | A | A | A | A | A |
| Internal pressure fatigue characteristics | A | A | A | A | A | A |

TABLE 2

| | Example 7 | Example 8 | Example 9 | Comparative Example 1 | Example 10 |
|---|---|---|---|---|---|
| Resin component | A1 | A1 | A2 | A1 | A1 |
| Hydrogen permeability coefficient of resin [cc · cm/($cm^2$ · s · cmHg)] | $2.2 \times 10^{-11}$ | $2.2 \times 10^{-11}$ | $2.4 \times 10^{-11}$ | $2.2 \times 10^{-11}$ | $2.2 \times 10^{-11}$ |
| Type of reinforcing fibers | Carbon fiber | Carbon fiber | Carbon fiber | Carbon fiber | Carbon fiber |
| Reinforcing fiber volume content (outer region) [vol. %] | 60.2 | 60.9 | 63.2 | 60.7 | 60.9 |
| Reinforcing fiber volume content (central region) [vol. %] | 59.7 | 61.4 | 58.4 | 61.2 | 59.8 |
| Reinforcing fiber volume content (inner region) [vol. %] | 59.1 | 59.9 | 62.3 | 61.9 | 59.2 |
| Ratio of continuous reinforcing fiber contents (vol. %) (inner region/outer region) | 0.98 | 0.98 | 0.99 | 1.02 | 0.97 |
| Ratio of continuous reinforcing fiber contents (vol. %) (outer region/central region) | 1.01 | 0.99 | 1.08 | 0.99 | 1.02 |
| Ratio of continuous reinforcing fiber contents (vol. %) (inner region/central region) | 0.99 | 0.98 | 1.07 | 1.01 | 0.99 |
| Thickness of gas barrier layer [cm] | 3 | 5 | 5 | 5 | 5 |
| Amount of gas permeated through pressure vessel in 24 hours [$cm^3$] | 168 | 1725 | 2429 | 105 | 82 |
| Void rate of gas barrier layer [vol. %] | 0.1> | 0.8 | 1.2 | 0.1> | 0.1> |
| Fatigue characteristics during water absorption | A | A | B | C | A |
| Internal pressure fatigue characteristics | A | B | A | C | A |

In Table 1 and Table 2 above, "0.1>" means less than 0.1 vol. %.

As is clear from the results shown above, the pressure vessel of the present invention had excellent gas barrier properties, and cracks were less likely to occur in various conditions. In particular, a pressure vessel having excellent

5 Mouthpiece
6 Boss
7 Valve
8 Inner region
9 Central region
10 Outer region

The invention claimed is:

1. A pressure vessel comprising a layer at least in a body part of the pressure vessel, the layer comprising a fiber-reinforced resin material containing a resin component and a continuous reinforcing fiber, wherein a ratio (inner region/outer region) of a content (vol. %) of the continuous reinforcing fiber in an inner region of the layer to a content (vol. %) of the continuous reinforcing fiber in an outer region of the layer is from 0.80 to 0.99, the inner region being defined as up to 0.1% of the thickness of the layer from an inner side of the layer in a thickness direction, the inner side of the layer facing an interior of the pressure vessel, and the outer region being defined as up to 0.1% of the thickness of the layer from an outer side of the layer in a thickness direction, the outer side of the layer facing an exterior of the pressure vessel, and a content (vol. %) of the continuous reinforcing fiber in a central region of the layer is from 30 to 70 vol. %, the central region being between the inner region of the layer and the outer region of the layer, in the thickness direction.

2. The pressure vessel according to claim 1, wherein a ratio (outer region/central region) of the continuous reinforcing fiber content (vol. %) in the outer region to the continuous reinforcing fiber content (vol. %) in the central region is from 1.01 to 1.11.

3. The pressure vessel according to claim 1, wherein a ratio (inner region/central region) of the continuous reinforcing fiber content (vol. %) in the inner region to the continuous reinforcing fiber content (vol. %) in the central region is from 0.95 to 1.05.

4. The pressure vessel according to claim 1, wherein a thickness of the layer is from 1 to 10 cm.

5. The pressure vessel according to claim 1, wherein the resin component comprises a thermosetting resin.

6. The pressure vessel according to claim 1, wherein the resin component comprises an epoxy resin composition, the epoxy resin composition comprising an epoxy resin and an epoxy resin curing agent, the epoxy resin curing agent containing a reaction product of a component (x1) and a component (x2) below:

(x1) at least one selected from the group consisting of m-xylylenediamine and p-xylylenediamine; and (x2) at least one selected from the group consisting of an unsaturated carboxylic acid represented by Formula (1) and a derivative thereof:

(1)

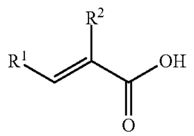

where in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

7. The pressure vessel according to claim 1, wherein the continuous reinforcing fiber comprises a carbon fiber.

8. The pressure vessel according to claim 1, wherein a void rate of the layer is 1 vol. % or less.

9. The pressure vessel according to claim 1, wherein the body part of the pressure vessel has a liner on the inner side of the layer.

10. The pressure vessel according to claim 1, wherein the body part of the pressure vessel does not have a liner on the inner side of the layer.

11. The pressure vessel according to claim 2, wherein a ratio (inner region/central region) of the continuous reinforcing fiber content (vol. %) in the inner region to the continuous reinforcing fiber content (vol. %) in the central region is from 0.95 to 1.05.

12. The pressure vessel according to claim 2, wherein a thickness of the layer is from 1 to 10 cm.

13. The pressure vessel according to claim 2, wherein the resin component comprises a thermosetting resin.

14. The pressure vessel according to claim 2, wherein the resin component comprises an epoxy resin composition, the epoxy resin composition comprising an epoxy resin and an epoxy resin curing agent, the epoxy resin curing agent containing a reaction product of a component (x1) and a component (x2) below:

(x1) at least one selected from the group consisting of m-xylylenediamine and p-xylylenediamine; and (x2) at least one selected from the group consisting of an unsaturated carboxylic acid represented by Formula (1) and a derivative thereof:

(1)

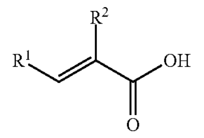

where in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

15. The pressure vessel according to claim 2, wherein the continuous reinforcing fiber comprises a carbon fiber.

16. The pressure vessel according to claim 2, wherein a void rate of the layer is 1 vol. % or less.

17. The pressure vessel according to claim 2, wherein the body part of the pressure vessel has a liner on the inner side of the layer.

18. The pressure vessel according to claim 2, wherein the body part of the pressure vessel does not have a liner on the inner side of the layer.

19. The pressure vessel according to claim 2, wherein a ratio (inner region/central region) of the continuous reinforcing fiber content (vol. %) in the inner region to the continuous reinforcing fiber content (vol. %) in the central region is from 0.95 to 1.05;

a thickness of the layer is from 1 to 10 cm;

the resin component comprises a thermosetting resin;

the continuous reinforcing fiber comprises a carbon fiber; and a void rate of the layer is 1 vol. % or less.

20. A method for producing the pressure vessel according to claim 1, the method comprising winding a fiber-reinforced resin material in a cylindrical form, the fiber-reinforced resin material comprising a resin component and a continuous reinforcing fiber, wherein a tension of the fiber-reinforced resin material when winding in the cylindrical form is from 0.01 gf to 3 gf per one strand of the continuous reinforcing fiber.

* * * * *